(12) United States Patent
Bienaimé et al.

(10) Patent No.: US 12,502,262 B2
(45) Date of Patent: Dec. 23, 2025

(54) TOOL FOR A MEDICAL TREATMENT, TOOL TIP, MOVING PART AND/OR HANDPIECE FOR SUCH A TOOL AND METHOD FOR PRODUCING SUCH A TOOL FOR A MEDICAL TREATMENT

(71) Applicant: FERTON HOLDING S.A., Delémont (CH)

(72) Inventors: Alex Bienaimé, Les Rousses (FR); Romain Vuillet, Kiruna (SE); Etienne Lebreton, Crissier (CH); Laurent Mosimann, Commugny (CH); Florent Beani, Gex (FR)

(73) Assignee: FERTON HOLDING S.A., Delémont (CH)

( * ) Notice: Subject to any disclaimer, the term of this patent is extended or adjusted under 35 U.S.C. 154(b) by 429 days.

(21) Appl. No.: 17/795,268

(22) PCT Filed: Jan. 28, 2021

(86) PCT No.: PCT/EP2021/052034
§ 371 (c)(1),
(2) Date: Jul. 26, 2022

(87) PCT Pub. No.: WO2021/152045
PCT Pub. Date: Aug. 5, 2021

(65) Prior Publication Data
US 2023/0066307 A1 Mar. 2, 2023

(30) Foreign Application Priority Data

Jan. 28, 2020 (EP) .................................... 20154169

(51) Int. Cl.
*A61C 17/20* (2006.01)

(52) U.S. Cl.
CPC .................................... *A61C 17/20* (2013.01)

(58) Field of Classification Search
CPC ....................................................... A61C 17/20
See application file for complete search history.

(56) References Cited

U.S. PATENT DOCUMENTS 4,229,168 A * 10/1980 Scholz, Jr. ............. A61C 1/148
433/102
4,295,827 A 10/1981 Martin
(Continued)

FOREIGN PATENT DOCUMENTS

CN 103429189 A 12/2013

OTHER PUBLICATIONS

International Search Report for corresponding application PCT/EP2021/052034 filed Jan. 28, 2021 Mail date Apr. 8, 2021.
(Continued)

*Primary Examiner* — Ralph A Lewis
(74) *Attorney, Agent, or Firm* — CANTOR COLBURN LLP

(57) ABSTRACT

A tool (1) for a medical treatment, in particular for a dental treatment, comprising: —a handpiece (40) having an ultrasound vibration source (30), —a moving part (10), performing, in an operating state, a vibration movement in a vibration direction (VD), and —a tool tip (20), in particular a scaler tip, being connected to the moving part (10) in an interface section (15), wherein in a non-vibrating state the tool tip extends in an extending direction, being slanted to the vibration direction of the moving part (10), in the interface section (15).

11 Claims, 11 Drawing Sheets

(56) References Cited

U.S. PATENT DOCUMENTS

Figure 1:
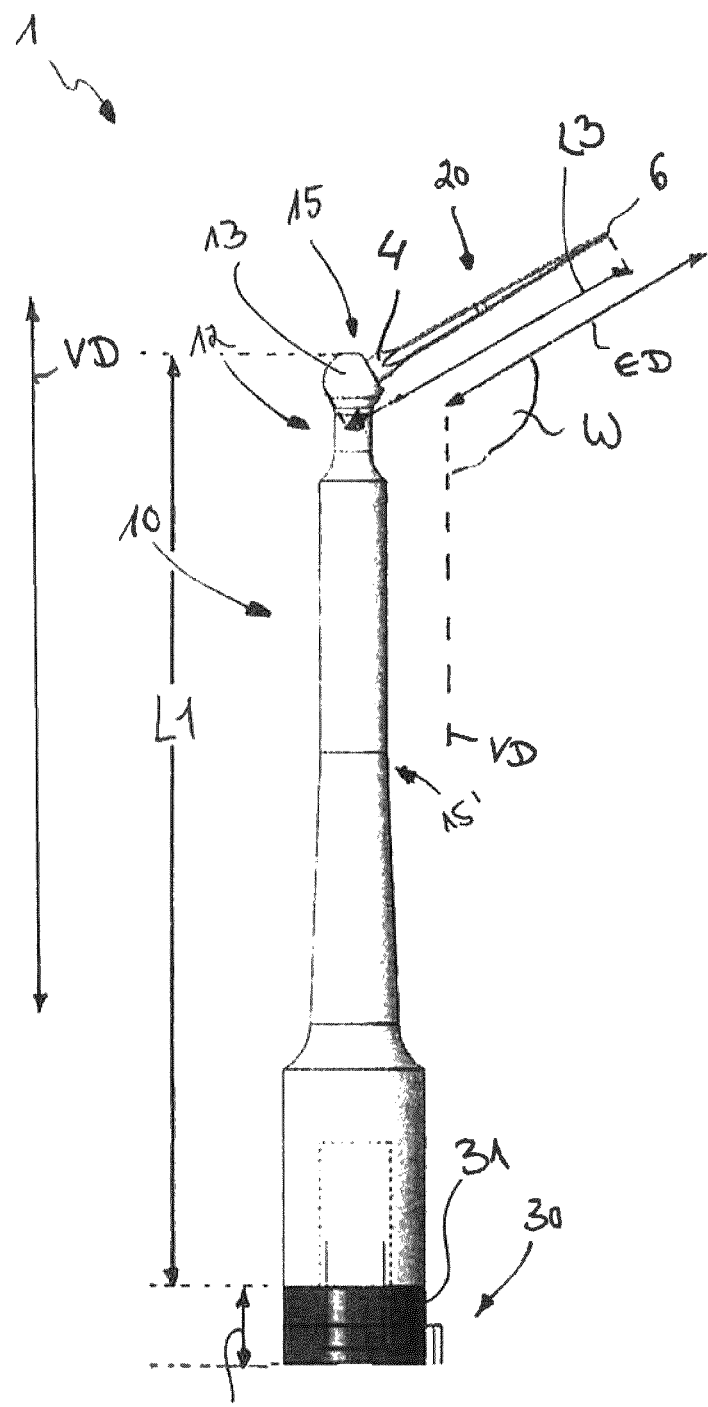

| | | | | |
|---|---|---|---|---|
| 4,484,891 A | * | 11/1984 | Nash | A61C 1/148 |
| | | | | 433/116 |
| 4,492,574 A | | 1/1985 | Warrin | |
| 4,505,676 A | * | 3/1985 | Gonser | A61C 5/42 |
| | | | | 433/119 |
| 4,580,979 A | * | 4/1986 | Leonard | A61C 5/42 |
| | | | | 433/118 |
| 4,818,229 A | * | 4/1989 | Vasile | A61C 5/42 |
| | | | | 433/119 |
| 5,190,456 A | * | 3/1993 | Hasegawa | B06B 1/186 |
| | | | | 433/118 |
| 5,236,358 A | * | 8/1993 | Sieffert | A61C 17/20 |
| | | | | 433/119 |
| 6,517,348 B1 | * | 2/2003 | Ram | A61C 1/148 |
| | | | | 433/118 |
| 2003/0096213 A1 | | 5/2003 | Hickok | |
| 2006/0035196 A1 | * | 2/2006 | Boiteux | A61C 17/20 |
| | | | | 433/118 |
| 2011/0020765 A1 | * | 1/2011 | Maxwell | A61C 17/02 |
| | | | | 433/119 |
| 2012/0308956 A1 | * | 12/2012 | DeVengencie | A61C 17/20 |
| | | | | 433/119 |
| 2023/0066307 A1 | * | 3/2023 | Bienaimé | A61C 17/16 |

OTHER PUBLICATIONS

Written Opinion for corresponding application PCT/EP2021/052034 filed Jan. 28, 2021 Mail date Apr. 8, 2021.

* cited by examiner

TOOL FOR A MEDICAL TREATMENT, TOOL TIP, MOVING PART AND/OR HANDPIECE FOR SUCH A TOOL AND METHOD FOR PRODUCING SUCH A TOOL FOR A MEDICAL TREATMENT

The present invention concerns a tool for a medical treatment, a tool tip, a moving part and/or a handpiece for such a tool and a method for producing such a tool.

Particularly, the present invention concerns a tool for a medical treatment that performs a vibration movement such as an oscillating movement during its operation. For example, the tool is a scaler that is intended for removing dental calculus during a dental treatment.

Dental calculus develops mostly in mouth areas that are difficult to access, in particular during home care treatments, for example by a toothbrush or a water spray treatment. These areas are also difficult to access during a professional care treatment, especially during scaling, and calculi formed are hard and strongly attached to the teeth.

Ultrasonic scaling instruments are well known to remove hard calculus due to their power of ultrasonic vibrations and a low impact on teeth. Thereby a tool tip, in particular a scaler tip, is typically designed as an interchangeable element, which can be screwed to a moving part that performs vibration movements along a vibration direction. Thereby, the tool tips of the prior art generally include a screwing section that extends in the mounted state along the vibration direction and is located at a proximal end of the scaler tip, the proximal end being the opposite end to the distal pointed tip of the scaler.

Considering the above, it was an object of the present invention to improve the tools for medical treatments, in particular dental treatments, wherein the tool performs a vibration movement during its operation, particularly to improve an efficiency for transferring the vibration movement from the ultrasound source to the tip element and a handling of the tool.

According to a first aspect of the present invention a tool for a medical treatment, in particular for a dental treatment, is provided, comprising
 a handpiece having an vibration source, in particular an ultrasound vibration source, i. e. a vibration source that causes an ultrasound vibration,
 a moving part, performing in a vibrating state, a vibration movement, in particular an ultrasound movement, along a vibration direction, and
 a tool tip, in particular a scaler tip, being connected to the moving part in an interface section at least in the operating state,
wherein in a non-vibration state the tool tip extends in an extending direction being slanted to the vibration direction in the interface section.

Contrary to the prior art, it is provided, according to the present invention, to connect the tool tip to the moving part such that the extending direction of the tool tip is slanted relative to the moving part, especially to the vibration direction of the moving part, in the interface section. It surprisingly turned out, that such an alignment of the tool tip relative to the vibration direction and particularly avoiding a threated section, being intended for screwing the tool tip to the moving part, allows to transfer or convert the vibration movement of the moving part to the tool tip in a more efficient way, especially compared to those tips including such a threated section for connecting the tool tip to the moving part. In particular, the tool avoids a threated section that typically extends along the vibration direction in the prior art, in particular at the front end of the tool tip, facing away from the pointed tip of the instrumental tool tip, i. e. at the proximal end of the tool tip. In particular, it is provided that the tool has an interface section between the tool tip and the moving part, said interface section being free of a screwing mechanism. Especially, the tool tip and the moving part form an angle in the interface section, i. e. in the section of being connected to each other. In particular, the angle between the extending direction of the tool tip and the moving part is a result of the form of the interface and no result of a course of the moving part or the tool tip itself. In particular, the moving part itself represents a sonotrode or horn or is at least connected to the sonotrode or horn, for example by a screwing mechanism. Furthermore, the tool is preferably provided for an external treatment, in particular for an outer surface of a tooth, and/or, especially, the tool tip performs a flexural motion movement and no rotational movement. In the vibrating state the tool tip, for example, performs a flexural motion, in particular in a plane extending along the extension direction of the tool tip and perpendicular to the cross section of the tool tip. For example, the performed vibration of the tool tip is small. For instance, the amplitude is smaller than 100 µm (max displacement peak). In the non-vibrating state, no vibration is transferred to the tool tip, but preferably the tool tip is connected to the moving part. Particularly, in the interface section, the tool tip extends in an extending direction being slanted to the vibration direction in the non-vibrating state, i.e. when the tool tip is connected to the moving part and is not actuated to vibrate.

Preferably, the tool is a dental treatment tool for removing calculus and/or a surface treatment of a tooth, in particular subgingival and/or supragingival. Such a tool might be a scaler. Preferably, the tool tip is located during operation next or close to the dental calculus for removing calculus by an outside treatment of the tooth or teeth. For example, the vibration source, in particular the ultrasound vibration source, causing the vibration motion of the moving part, comprises a piezo element that causes a flexural motion of the moving part along the vibration direction. Preferably, the vibration source effects an ultrasound movement that causes an efficient and harmless way for removing calculus from the teeth.

Furthermore, it is possible by using the interface section as mentioned above to reduce the dimensions of the handpiece, since the vibration source can be dimensioned smaller. As a consequence, it is possible to provide a tool being much easier to handle by an operator. Especially, the dimensions of the tool can be reduced, since for having the same efficiency the ultrasound vibration source can be dimensioned smaller compared to those tools known from the prior art. This is another benefit of making the energy transfer between the moving part and the tool tip more efficient. Other examples besides a scaler for removing dental calculus might be medical tools for cutting tissues, bones and/or teeth.

In particular, it is provided that a connection between the moving part and the tool tip is waterproof to avoid having a spirous waterjet.

Furthermore, it is preferably provided that the vibrational direction mainly corresponds to a longitudinal direction of the handpiece, i.e. a direction along that the handpiece extends. Preferably, it is provided that the moving part has a first length measured between a proximal front-end being connected to the vibration source and a distal front-end being opposite to the (ultrasound) vibration source. Especially, the tool tip has a third length, being smaller than the first length.

Preferably, the tool tip is non-bent, at least in a non-operating state, i. e. the tool tip is free of a bent or an arc-like section. For example, the tool tip is formed needle-like and/or has a straight general course. Preferably, the tool tip has a mainly straight course along its whole extension, at least over 76% of its whole extension. In particular, in case of a scaler, the tool tip avoids a curved or arced section. As a consequence, it is advantageously possible to use materials for the tool tip that cannot be bent and which could not be used so far for usual scaler tips known from the prior at. This makes the choice of materials for the tool tips even more flexible and allows materials that have advantages for removing the calculus, but were not used in the past due their inability to be bent properly. Preferably, the moving part extends straight along the vibration direction, i. e. is free of a bent or an arc-like section, too. Thus, a bent section at the end of the moving part is avoided.

As a consequence, it is possible to avoid oversizing handpieces in weight and dimensions. Since the weight of the tool is decreased, it is advantageously possible to reduce a probability for creating a musculoskeletal disease of the operator. Furthermore, it has been shown that oversized diameters or dimensions of handpieces encourage operators to apply excessive forces on the tooth and thus creates iatrogenic damages. This can be avoided by reducing the dimensions of the handpiece, which is allowed due to the more efficient transfer of the energy from the moving part to the tool tip.

In particular, the comparably large first length allows placing the distal front-end of the moving part being faced away or being opposite to the ultrasound vibration source as close as possible to the tooth. This further reduces losses in energy during operation. Furthermore, it is advantageously possible to simplify the manufacturing process of realizing the tool tip, because a complicated bending method as well as a cutting mechanism can be avoided.

Preferably, it is provided that in the operating state and/or mounted state the tool tip reaches in and/or through a recess of the moving part. Particularly, the moving part, in particular at its distal front end, more precisely the end being located opposite to the vibrational source, includes a recess or an opening in that the tool tip can be inserted for being mounted. Preferably, the moving part has a recess that is slanted compared to the vibration direction. Especially, the recess is orientated such that the recess defines the orientation of the extending direction of the tool tip in the mounted state, i. e. in the mounted state the general course of the tool tip extrapolates the general course of the recess. Preferably, the proximal end of the tool tip, forming an inserting section, is configured for being inserted into the recess and, for example, reaches through the recess in the moving part, preferably in form of a bore or an opening, for example a through bore or a blind hole, especially such that the proximal end of the tool tip is flush with an outer surface of the moving part in the mounted state, in particular opposite to the pointed tip of the tool tip or at the proximal end of the tool tip.

In a preferred embodiment it is provided that in the operating state, the tool tip is connected to the moving part by a frictional connection and/or by a form fitting connection, without a screwing mechanism. Preferably, the tool tip is connected to the moving part by a press fit connection. Further, it is conceivable that the strength of the press fit connection defines, whether the tool tip can be removed or whether it is permanently connected to the moving part. It is even conceivable that the interface section includes a bayonet lock for connecting the tool tip and the moving part. It is also thinkable that the inside of the recess has grooves that allows establishing a form fitting connection between a tool tip and the moving part, in particular in a direction parallel to the extending direction. In an alternative embodiment it might be even conceivable that an additional mounting element, such as a screw is provided for being inserted into the moving part such that the mounting element supports fixing the tool tip to the moving part, by acting on the tool tip, in particular on its inserted section or inserting section.

Preferably, it is provided that:
the tool tip is exchangeable or permanently connected to the moving part and/or
the moving part is exchangeable or permanently connected to the ultrasound source of the handpiece.

In case of a permanent connection, it can be avoided that unsuitable tool tips are connected to the moving part. This reduces the probability of damages at the tooth during operation. Furthermore, it is advantageously possible to adapt the handpiece, especially the ultrasound vibration source to the specific design of the tool tip. As a consequence, an oversizing of the handpiece can be avoided and the ultrasonic motor, for example in form of piezo electric transducers, can be designed smaller. As a consequence, this has direct influence on the ergonomic benefits for handling the tool and increases the comfort of the operator. As a consequence, less iatrogenic damages at the tooth are produced. In case of an exchangeable or interchangeable tool tip and/or moving part it is advantageously possible to just remove the tool tip, especially when the tool tip is worn after several time of use. Thus, only the handpiece and/or the moving part have to be sterilized for the next treatment.

Furthermore, it is provided that the tool tip has a polygonal cross section in a plane, perpendicular to the extending direction, and/or tapers along its extending direction. Especially the pointed tip, caused by the tapered design of the tool tip, allows improvements of removing the dental calculus during the operation. Preferably, a ratio between a length of a tapered section of the tool is between 0.5 mm and 10 mm, preferably between 1 and 6 mm and more preferably between 2 and 4 mm. Furthermore, it is provided that the tool tip has at least a polygonal, for example rectangular, cross section in the inserting section that is inserted into the recess in the mounted state. As a consequence, it is possible to realize a key lock system that allows only a specific type of tool tips to be inserted into the recess. As a consequence, the handpiece can be individualized for specific types or specific kinds of tool tips, allowing optimizing the handpiece, especially the ultrasound vibration source being optimized, preferably regarding its dimension, for the specific types.

Preferably, the moving part has a tapered section having a reduced diameter measured in a plane perpendicular to the vibration direction, in particular in comparison to the diameter of the moving part being adjacent to the vibration source.

Such a tapered section is preferably arranged directly next to the recess that is intended for receiving the tool tip in the mounted state. The tapered section concentrates the translation of vibration movement to the interface section, which connects the tool tip and the moving part. The ratio of the length of the tapered section of the moving part to the first length, i. e. the total length of the moving part is between 0.0125 and 0.3, preferably between 0.031 and 0.15 and most preferably between 0.05 and 0.10.

In particular, it is provided that the moving part includes a cylinder-like section in the interface section, wherein the cylinder-like section comprises the recess for receiving the tool tip. In other words: the distal end of the moving part, in particular of the sonotrode of the transducer, is formed as a cylinder-like section. A symmetry axis of such a cylinder-like section is orientated parallel and preferably concentric to the extending direction of the recess or the non-bended tool tip in the mounted state. Furthermore, it is conceivable that the moving part includes a shaft section in addition to the cylinder-like section at the distal end of the moving part. The shaft section has preferably a reduced cross section in a direction being perpendicular to the vibration direction. For example, the shaft section is formed by two flat surfaces being parallel to each other. The parallel surfaces simplify handling during inserting the tool tip into the recess, since the moving part can be gripped in a simpler manner. The ratio of the distance between the two parallel surfaces is smaller than an outer diameter of the cylinder like section. In particular, a ratio of the distance to the outer diameter is between 0.5 and 0.9, preferably between 0.6 and 0.8 and more preferably between 0.7 and 0.78. Such a slim shaft section reduce the probability that the shaft blocks the view to the tool tip during operation, in particular to a treatment zone. Furthermore, the configuration of the cylinder like section and the shaft section can simple be manufactured by milling. The shaft section extends preferably to the handpiece, i. e. in a region being outside of a hosing forming the handpiece. Another benefit of the cylinder-like section is avoiding any coupled lateral mode and therefore guaranteeing a better control of the vibration direction. Since the operator has direct visual access to the tip, he is directly informed about the vibration direction. As a result a safer treatment for the patient can be guaranteed, resulting in a low invasive treatment and less or no pain.

Especially, it is provided that the moving part includes a ball or cylinder-like section in the interface section, wherein the ball-like section comprises a recess for receiving the tool tip. By using a ball-like section, it is advantageously possible to avoid injuries at the inside of the oral cavity. Furthermore, the ball-like section increases again the diameter of the moving part along the vibration direction at its front and is located opposite to the ultrasound vibration source. Especially, reducing the diameter of the moving part, especially at the rear end of the moving part, i. e. the end being located opposite to the vibration source, reduces the weight of the moving part. In particular, it turned out that the cylindrical shape or the rear end or the moving part improves the ergonomics and the tool tip fixation.

In another embodiment it is provided that the moving part is made from titanium, preferably the ultrasonic horn is titanium ($Ti_6L_4V$) or aluminum (7075 T6). Thus, a material is used to be light compared to the countermass (stainless steel), having high elastic properties, good sound propagation (high resonator behavior, high quality factor) and a compatible celerity with ceramics used and back mass material. It needs to be biocompatible, in particular the fluid channel and/or an external contact. For the tool tip, mainly hard biocompatible material could be used (hard stainless steel (quenching, superalloy, duplex, . . . ), ceramics ($Al2O3$, $ZRO2$, $Si3N4$), cermets (W-C, and other carbides) and/or glass metal (amorphous metal). Furthermore, it is provided that an angle between the vibration direction of the moving part and the extension direction of the tool tip is between 90° and 150°, preferably 100° and 140° and most preferably between 110° and 130°. Thus the requirements for the instrumental tip, in particular for the scaler, are established that are caused by the oral cavity of the patient.

In another embodiment, it is provided that the ratio between a second length assigned to a length of the vibration source, measured in the vibration direction, to the first length assigned to the moving part, measured in the vibration direction, is between 0.025 and 0.5, preferably between 0.04 and 0.13 and most preferably between 0.05 and 0.1. Thus, it is advantageously possible to provide a short and compact tool, being easy to handle for the operator. Especially, the first length L1 depends on the frequency and the transducer configuration and, for example for titanium material, has a value between 20 and 80 mm, preferably between 30 and 70 mm and more preferably between 40 and 60 mm. Furthermore, it is preferably provided that the second length L2 has a value between 1 and 15 mm, preferably between 2 and 8 mm and most preferably between 3.5 and 7.5 mm In particular, it is provided that the moving part of the handpiece is a multi-part-system. Such configuration allows to remove or interchange the whole section including the tool tip and the moving part, i.e. the tool tip and the moving part can be removed or exchanged, whereas the handpiece, including the ultrasound vibration source, can be used several times. In particular, the moving part and the handpiece are connected to each other in another interface section.

Another subject matter of the present invention is a tool tip for a tool according to the present invention. All the benefits and features mentioned in the context of the tool applies analogously to the tool tip and vice versa.

Another subject matter of the present invention is a handpiece and/or a moving part of the tool according to the present invention. All benefits and features described in the context of the tool applies analogously to the handpiece and the moving part and vice versa.

Another object of the present invention is a method for manufacturing a handpiece and/or moving part and/or tool tip including an interface section of the tool according to the present invention. All the features described in the context of the tool applies analogically to the method and vice versa.

Wherever not already described explicitly, individual embodiments or their individual aspects and features can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

Figure 2:
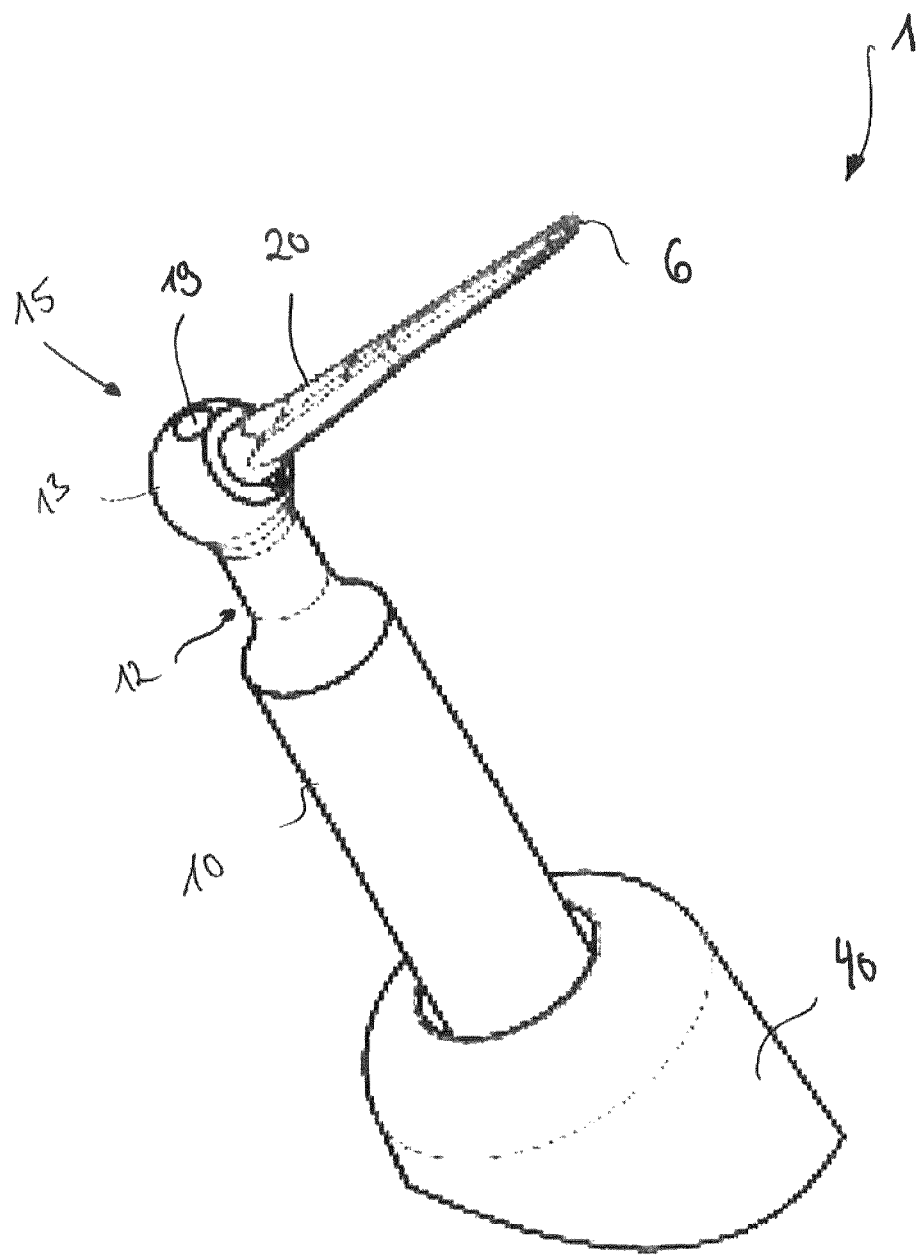
Figure 3:
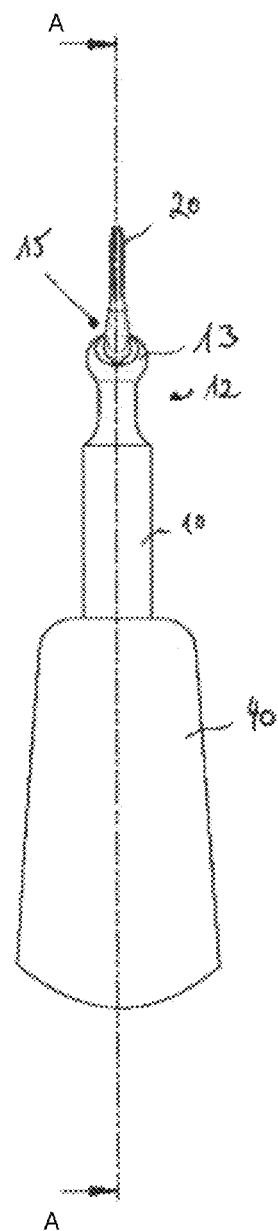
Figure 4:
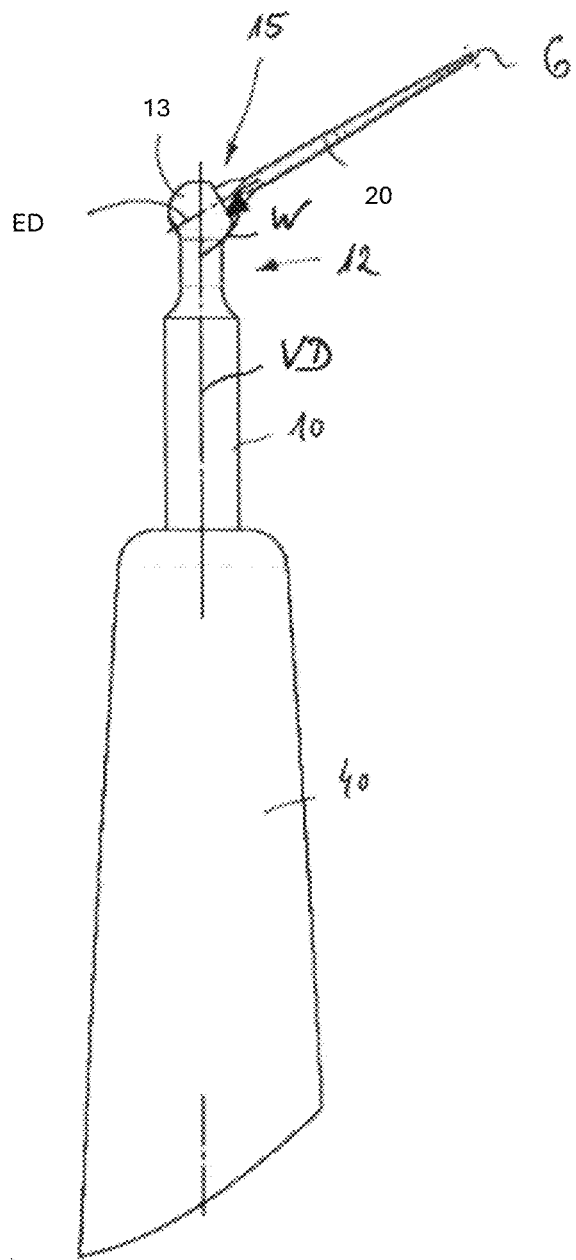
Figure 5:
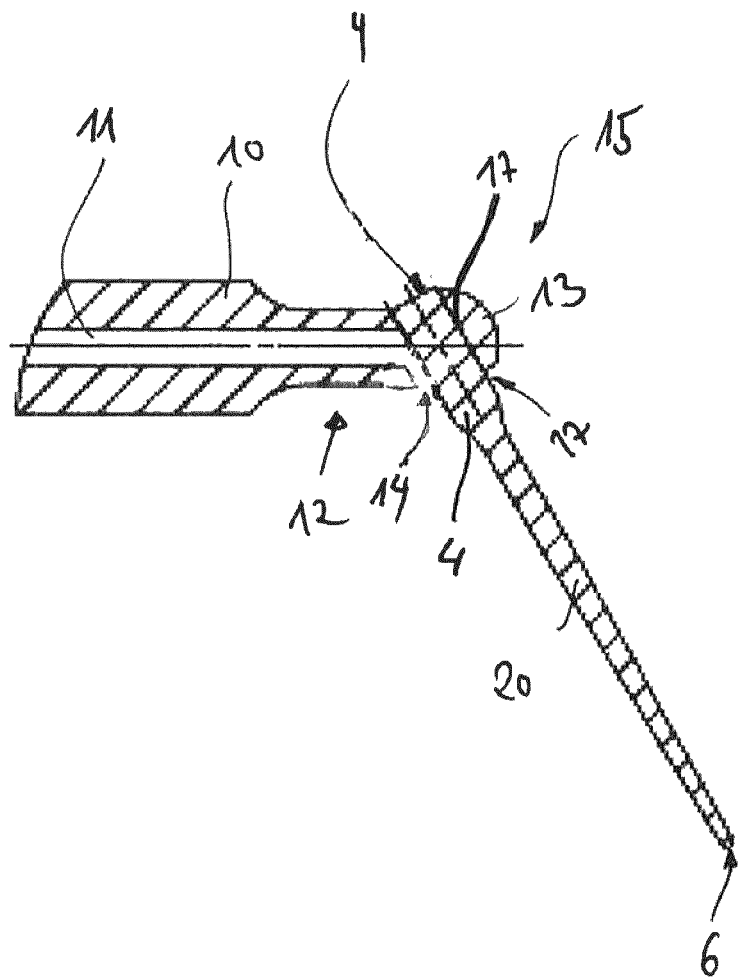
Figure 6:
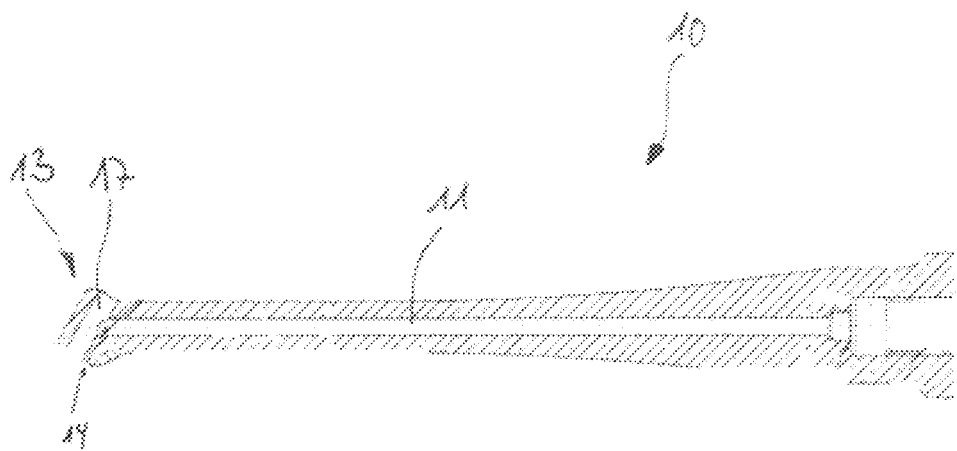
Figure 7:
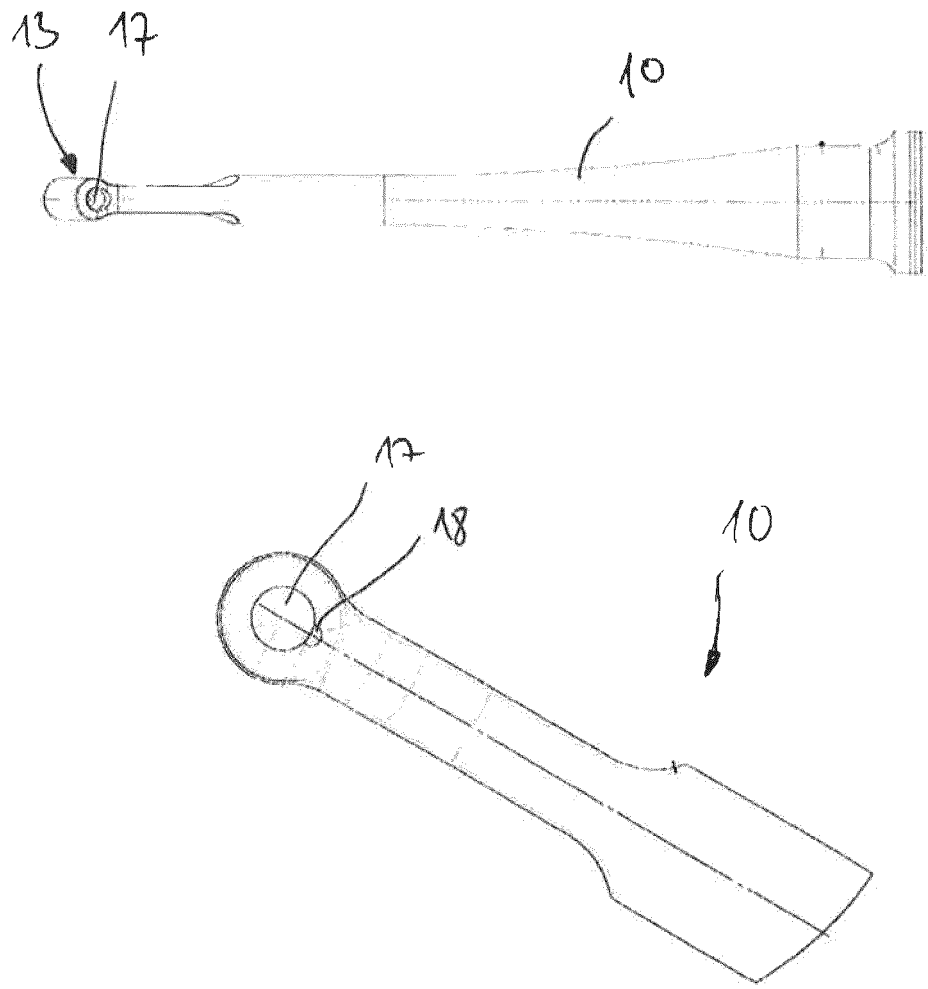
Figure 8:
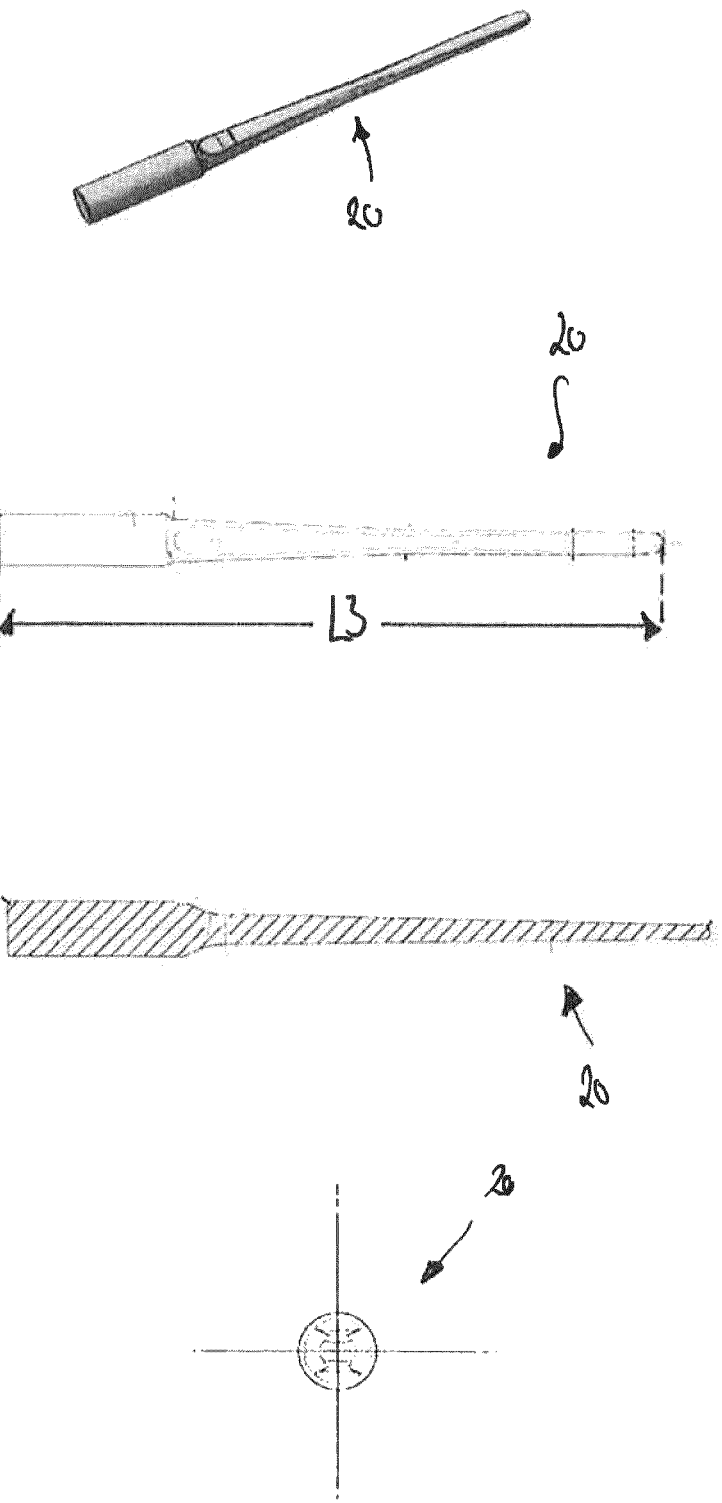
Figure 9:
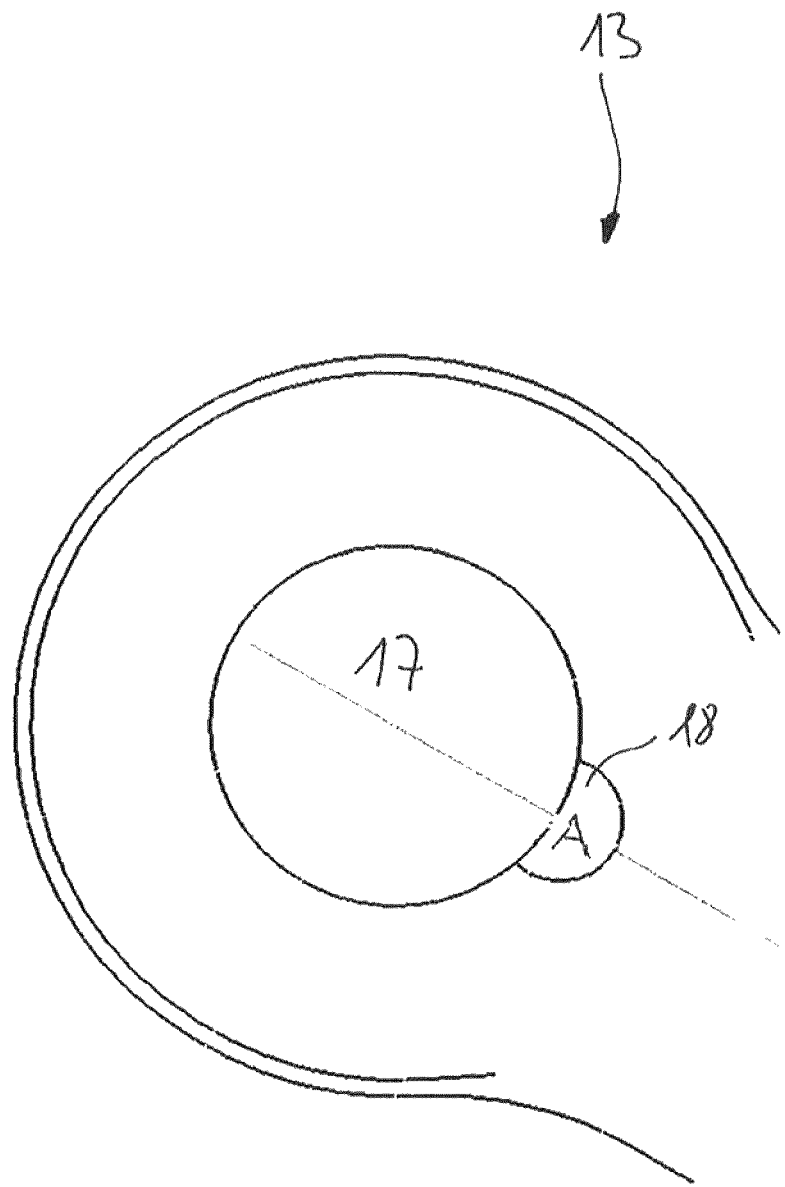
Figure 10:
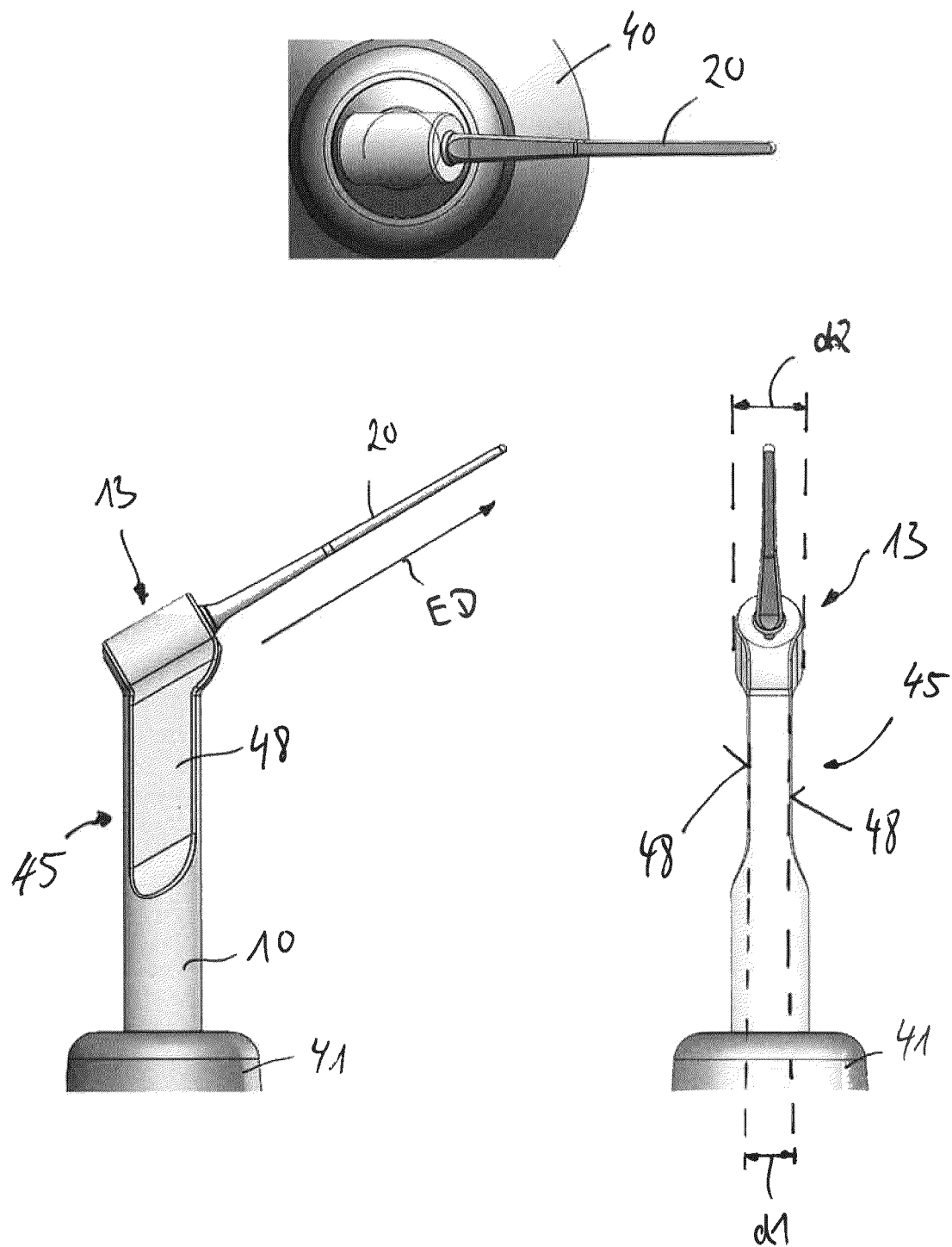
Figure 11:
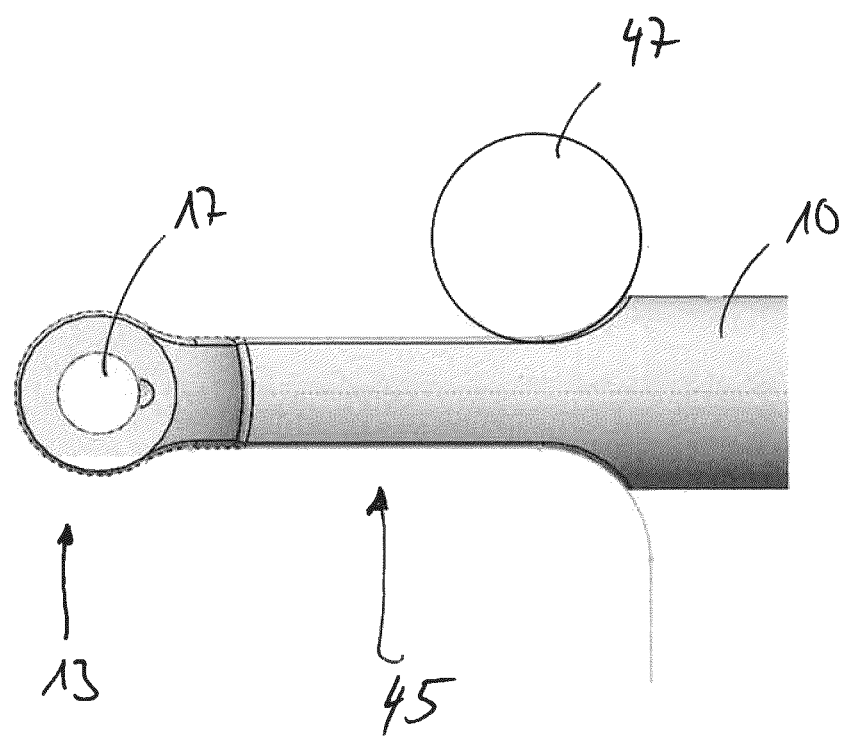

In the drawings:

FIG. 1 schematically illustrates a tool for medical treatment according to a first preferred embodiment in a side view, FIG. 2 schematically illustrates the tool for medical treatment of FIG. 1 including a handpiece in a perspective view, FIG. 3 schematically illustrates the tool for medical treatment of FIG. 1 including a handpiece in another side view FIG. 4 schematically illustrates the tool for medical treatment of FIG. 1 including a handpiece the side view, FIG. 5 schematically illustrates in detail an interface section of the tool for medical treatment of FIG. 1 in a side view, FIG. 6 schematically illustrates a moving part for a tool according to a second preferred embodiment in a cross-sectional view;

FIG. 7 schematically illustrates the moving part of FIG. 6 in two perspectives views FIG. 8 a tool tip according to a preferred embodiment of the present invention FIG. 9 a detailed view on the recess and the outlet channel of the moving part and FIG. 10 schematically illustrates a distal end of a tool according to a third preferred embodiment of the present invention in three perspective views and FIG. 11 schematically shows a manufacturing step for producing a moving part of the tool of FIG. 10.

In FIG. 1 schematically a tool 1 for a medical treatment according to a first preferred embodiment is shown in a side view. Especially, FIG. 1 illustrates a tool 1 for a dental treatment, in particular a scaler for removing dental calculus. Such a tool 1 uses a vibration movement, in particular an ultrasound vibration movement for moving a tool tip 20 such that the tool tip 20, located at or next to dental calculus at a tooth, removes said dental calculus from the tooth being treated during operation. Preferably, the tool 1 includes a vibration source 30, in particular an ultrasound vibration source, being intended to cause the ultrasound vibration movement along a vibration direction VD. Especially, the vibration source 30 includes at least one piezo element 31. These piezo elements 31 are typically configured such that an electrical energy can be translated to a small expansion of the piezo element 31 in vibration direction VD that creates the ultrasound vibration movement.

In particular, it is provided that the tool 1 further comprises a moving part 10 and a tool tip 20. In particular, the moving part 10 represents a sonotrode or horn. Thereby, the tool tip 20 represents in FIG. 1 the scaler that interacts with a surface of a tooth, in particular its outside, during a treatment. Especially, the tool tip 20 is formed as a non-bent component. In other words: the tool tip 20 in form of a needle, i. e. the tool tip 20 has a straight course along the extension direction ED from an inserting section, being inserted into a recess 17 in the interface section 15, to a pointed tip or distal end 6 of the tool tip 20. As a consequence, the tool tip 20 differs from the scaler tips known by the prior art that are typically bent for meeting the requirement that the rear end (seen from the vibration source) or distal end of the tool tip 20 needs to be extended slanted about an angle W of about 120° to the vibration direction VD, in particular for meeting the requirements that are defined by an oral cavity geometry.

However, instead of using a screw section, which allows connecting the tool tip 20 to the moving part 10 by a screw mechanism, it is provided according to the embodiment shown in FIG. 1 to connect the tool tip 20 to the moving part 10 in an interface section 15, in particular without a screwing mechanism. Preferably, the tool tip 20 is connected to the moving part 10 in the interface section 15 by a frictional-fitting and/or form-fitting, in particular without a screwing mechanism. Especially, the tool tip 20 is connected to the interface section 15 of the moving part 10 by a press fit connection. Depending on a strength of the press fit, the tool tip 20 is arranged or connected to the moving part 10 permanently or non-permanently, for example.

Furthermore, it is provided that the tool tip 20 is inserted into a recess 17, wherein the recess 17 is included in the moving part 10. Thereby, the tool tip 20 extends in an extending direction ED being slanted to the vibration direction VD in the interface section 15. It turned out that by connecting a non-bent tool tip 20 such to the moving part 10 that the tool tip 20 extends slanted to the vibration direction VD of the moving part 10, it is possible to transfer the vibrational movement from the moving part 10 to the tool tip 20 in a more efficient way, compared to those scalers having a screw section for screwing the tool tip 20 to the moving part 10 of the tool.

Another benefit of using a non-bent, i. e. needle-like, tool tip 20 is the possibility of relying on new or different materials that, for example, are not able to be bent in a way sufficient to realize a bent tool tip 20 in form of a scaler known from the prior art. Preferably, the extending direction ED and the vibration direction VD of the tool 1 having the non-bent tool tip 20 form an angle W that mainly corresponds to 120°, for meeting the requirements, being defined by the oral cavity geometry.

Preferably, it is provided that the tool 1 has a first length L1 between a front end of the vibration source 30 and a front end of the moving part 10 being faced away from the vibration source 30, measured along the vibration direction VD. Due to the connection by a press fit in the interface section 15, it is possible to decrease a third length L3 of the tool tip 20 along the extending direction ED and/or a second length L2 of the vibration source 30 along the vibration direction VD. As a consequence, it is possible to locate the front end of the moving part 10 facing away from the vibration source 30 closer to the tooth during the treatment. This makes the energy transfer for removing the calculus even more efficient.

Preferably, a ratio of the second length L2 to the first length L1 is between 0.025 and 0.5, preferably between 0.04 and 0.13 and most preferably between 0.05 and 0.1. Especially, the first length L1 depends on frequency and transducer configuration and, for example for titanium material, has value between 20 and 80 mm, preferably between 30 and 70 mm and more preferably between 40 and 60 mm. Furthermore, it is preferably provided that the second length L2 has a value between 1 and 15 mm, preferably between 2 and 8 mm and most preferably between 3.5 and 7.5 mm. Preferably, the third length L3 depends on the application. For example the third length is 20 mm for a universal tip (sub- and supragingival), but could be longer or shorter depending of the application for example shorter for high amplitude supragingival tip for example (around 14 mm). Furthermore, reducing the second length L2, in particular compared to the first length L1, it is advantageously possible to produce a more compact and smaller handpiece 40 for the tool 1 that allows a much easier handling for an operator.

In FIG. 2, the tool 1 for medical treatment of FIG. 1, including a handpiece 40, is shown in a perspective view. As it is illustrated, the moving part 10 reaches through a hole in a region at the rear end of the handpiece 40. In particular, it is provided that the handpiece 40 at least partially surrounds the moving part 10 of the tool 1. For example, it is also conceivable that the moving part 10 is a multipart-system having another interface section 15' that allows removing at least a part of the moving part 10 from another section being permanently connected to the vibrational source 30.

Furthermore, it is shown in FIG. 2 that the needle-like, non-bent tool tip 20 tapers to its distal end 6. Furthermore, it is preferably provided that the tool tip 20 has a polygonal cross section in a plane perpendicular to the extending direction ED. For example, the cross section has a rectangular form. Furthermore, it is provided that at its rear end, i. e. its proximal end 4, the tool tip 20 has an inserting section. This inserting section is intended to be inserted into a recess 17 of the moving part 10 in a mounted state such that the tool tip 20 is connected to the moving part 10 by a press fit.

Preferably, the interface section 15 is configured as a lock and key principle that allows only those tool tips 20 to be connected to the recess 17 that have the same cross section in the inserting section that corresponds to the form of the recess 17 of the moving part 10, in particular in the interface section 15. Furthermore, it is provided that the recess 17 is part of a section 13 of the moving part 10 that forms the rear end of the moving part 10, particularly being faced away from the ultrasound source 30. Furthermore, an additional opening 19 is provided at the front-end of the moving part 10 being faced away from the ultrasound vibration source 30. Such an additional opening 19 allows access, in particular visual access, to the inserting section of the tool tip 20 being inserted into the recess 17. As a consequence, it is possible to identify the used tool tip 20, when the tool tip 20 is marked, for example by a colour, such that it is possible to visually identify whether the proper tool tip 20 is arranged inside the recess correctly. Alternatively or additionally it is possible to use this opening 19 for fastening or fixing the tool tip 20 to the moving part 10 or support the press-fit connection by an additional means for fixation, such as a screw reaching through the opening 19, for example.

The tool 1 for medical treatment in FIG. 1, including a headpiece 40 is shown in another side view in FIG. 3. In particular, it is shown that the moving part 10 has a tapered section 12, being located preferably directly next to a ball- or cylinder-like section 13. Such a design of the moving part 10, in particular at its rear end (seen from the vibration source 30), allows concentrating the vibrational movement, caused by the vibration source 30 to the interface section 15 for a most efficient transfer of the movement energy from the moving part 10 to the tool tip 20.

In FIG. 4, the tool 1 for medical treatment of FIG. 1, including the handpiece 40 is shown in the side view. It is shown that the handpiece 40 tapers along the vibrational direction VD from a proximal end to a distal end.

In FIG. 5, in detail the interface section 15 of the tool 1 for medical treatment of FIG. 1 is shown in a side view. In particular, it is provided, that the tool tip 20 reaches through a recess 17 that is included in the ball- or cylinder-like section 13 of the rear end of the moving part 10. In particular, it is provided that the recess 17 is slanted relative to the vibration direction VD and defines the direction of the tool tip 20, i. e. the extending direction ED of the tool tip 20 being inserted in the recess 17. Furthermore, it is provided that the tool tip 20 includes a fluid channel 11, being located inside of the moving part 10, the fluid channel 11 preferably allowing the transport of the fluid from the handpiece 40 to an outlet 14 located, for example, in the interface section 15 of the tool 1 or another outlet (not shown) at the distal end 6 of the tool tip 20. Particularly, the outlet 14 is located directly next to the recess 17 or is even part of the recess 17 that is used for connecting the tool tip 20 to the moving part 10 by a press fit.

In FIG. 6, schematically a moving part 10 for a tool 1 according to a second preferred embodiment in a cross-sectional view is shown. The moving part 10 illustrated in FIG. 6 mainly differs from the moving part 10 of the tool 1 shown in the FIGS. 1 to 5 by using a cylinder-like portion 13 that forms the rear end of the moving part 10. Furthermore, it is provided that the fluid channel 11 is larger than the outlet channel 18. In particular, the cross section of the fluid channel 11, measured in a plane perpendicular to the stream direction, is at least twice, preferably at least three times and most preferably at least four time bigger than the cross section A of the outlet channel 18, measured in a plane perpendicular to the stream direction.

FIG. 7 shows the moving part 10 of FIG. 6 in two perspective views. In particular, the cylinder-like portion 13 of the moving part 10 includes a recess 17 for receiving the tool tip 20. In particular, the perspective in the lower illustration shows both the recess 17 and the outlet channel 18 in a top view.

FIG. 8 shows a tool tip 20 for the moving part 10 according to the first or second embodiment of the present invention in different perspectives. In particular, it is provided that the tool tip 20 is formed at least partially by a flat, straight tool tip 20 or needle.

FIG. 9 shows a detailed view on the outlet 14 and the recess 17 of the moving part 10. In particular, FIG. 9 illustrates the cross section A of the outlet channel 18 of the moving part 10. In particular, the cross section A of the outlet opening 14 and/or the outlet channel 18 is smaller than 0.8 $mm^2$ or between 0.05 and 0.78 $mm^2$, preferably between 0.05 and 0.39 $mm^2$ and most preferably between 0.05 and 0.15 $mm^2$ or even about 0.1 $mm^2$ In FIG. 10 a distal end of a tool 1 according to a third preferred embodiment is illustrated in three perspective views. The third embodiment mainly corresponds to the second preferred embodiment shown in the FIGS. 6 and 7. Especially, the moving part 10 of this tool 1 includes a cylinder like section 13 at its distal end. Further, the moving part 10 includes a shaft section 45. The shaft section 45 extends at least half of the spacing between the cylinder like section 13 and a housing 41 of the handpiece. The shaft section 45 preferably has a reduced cross section and more preferably includes two flat surfaces 48 being parallel to each other and spaced from each other by a distance d1. In particular, a ratio of the distance d1 to an outer diameter d2 of the cylinder-like section of the moving part 10 is between 0.5 and 0.9, preferably between 0.6 and 0.8 and more preferably between 0.7 and 0.78. Such a slim shaft section 45 reduce the probability that the moving part 10 blocks the view of the operator to the tool tip 20 during operation, in particular to a treatment zone and the vibrating tool tip 20.

FIG. 11 shows a manufacturing step for producing a moving part 10 of the tool 1 of FIG. 10. Especially, it is possible in case of a configuration, having a shaft section 45 and a cylinder-like section 13 at the distal end of the moving part 10 to use a machining process such as milling to create the corresponding outer contour of the moving part 10 at its distal end. Thus it is possible to create the parallel orientated flat surfaces 48 and the cylinder-like section 13, having a symmetry axis being parallel to an axis being slanted about 120° relative to the vibration direction VD and/or parallel to the extending direction ED of the tool tip 20 or the recess 17 for receiving the tool tip 20, in a simple manner. Especially, the manufacturing process can be simplified and accelerated, and as a result the cost for manufacturing the moving part 10 can be reduced. Actually, the circle in FIG. 11 illustrates a milling tool 47, which is used for creating the contour of the moving part 10 of FIG. 10. Especially, it is provided that the milling tool 47 is orientate about 120° to an extending direction of a rod, which is about to be processed to form the moving part 10. By a relative translation movement along the corresponding path (during the rotating movement of the milling tool for machining), automatically the orientation of the cylinder-like section 13 is created. And the end section of the shaft section 45 is slanted corresponding

REFERENCE NUMBERS 1 tool
4 proximal end 6 distal end
10 moving part
11 fluid channel
12 tapered section
13 ball-like or cylinder like section
14 outlet
15 interface section
15' another interface section
17 recess
18 outlet channel
19 opening
20 tool tip
30 vibration source
31 piezo element
40 handpiece
41 housing
45 shaft section
47 milling tool
48 flat surface
d1 distance
d2 outer diameter
VD vibration direction
ED extending direction
W angle
L1 first length
L2 second length
L3 third length

The invention claimed is:

1. A tool for a medical treatment comprising
a handpiece having a vibration source,
a moving part, performing, in a vibrating state, an ultrasound movement along a vibration direction, and
a tool tip being a scaler and being connected to the moving part at an interface section,
wherein in a non-vibrating state the tool tip extends in an extending direction, being slanted to the vibration direction of the moving part, in the interface section, wherein the interface section between the tool tip and the moving part is free of a screwing mechanism, wherein in the operating state the tool tip is connected to the moving part by a press fit connection or the tool tip is permanently connected to the moving part.

2. The tool according to claim 1, wherein the tool tip is non-bent, at least in a non-operating state.

3. The tool according to claim 1, wherein in an operating state the tool tip reaches in and/or reaches through a recess of the moving part.

4. The tool according to claim 3, wherein the moving part includes a cylinder-like section in the interface section, wherein a cylinder-shaped section comprises the recess for receiving the tool tip.

5. The tool according to claim 1, wherein in an operating state the tool tip is connected to the moving part by a frictional connection, in particular by a press fit connection, and/or by a form fitting connection.

6. The tool according to claim 1, wherein
the tool tip is exchangeable or permanently connected to the moving part and/or
the moving part is exchangeable or permanently connected to the ultrasound source of the handpiece.

7. The tool according to claim 1, wherein the tool tip
has a polygonal cross section in a cross section perpendicular to the extending direction and/or
tapers along its extending direction.

8. The tool according to claim 1, wherein the moving part comprises a tapered section having a reduced diameter, measured in a plane perpendicular to the vibration direction.

9. The tool according to claim 1, wherein the moving part is made from titanium.

10. The tool according to claim 1, wherein an angle between the vibration direction of the moving part and the extending direction of the tool tip is between 90° and 150°.

11. The tool according to claim 1, wherein the moving part of the handpiece is a multi-part system.

* * * * *